(12) United States Patent
Bakhmutsky et al.

(10) Patent No.: US 6,360,015 B1
(45) Date of Patent: Mar. 19, 2002

(54) RAM-BASED SEARCH ENGINE FOR ORTHOGONAL-SUM BLOCK MATCH MOTION ESTIMATION SYSTEM

(75) Inventors: Michael Bakhmutsky, Spring Valley; Viktor L. Gornstein, New York, both of NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/287,165

(22) Filed: Apr. 6, 1999

(51) Int. Cl.[7] .............................. G06K 9/00; H04N 7/36
(52) U.S. Cl. ................................... 382/236; 375/240.17
(58) Field of Search ............................. 382/236, 205, 382/238, 239–241, 300, 305; 375/240.17, 240.15, 240.16, 240.12; 348/606, 448, 402, 699, 384, 416

(56) References Cited

U.S. PATENT DOCUMENTS

| | | | | |
|---|---|---|---|---|
| 5,208,875 A | * | 5/1993 | Virtue et al. ................. | 382/254 |
| 5,461,423 A | * | 10/1995 | Tsukagoshi .................. | 348/416 |
| 5,539,467 A | * | 7/1996 | Song et al. .................. | 348/402 |
| 5,708,474 A | * | 1/1998 | Hong .......................... | 348/448 |
| 5,920,356 A | * | 7/1999 | Gupta et al. ................ | 348/606 |
| 6,266,373 B1 | * | 7/2001 | Bakhmutsky et al. .. | 375/240.17 |

OTHER PUBLICATIONS

PHA 23,420, U.S. Ser. No. 09/094,828, filed Jun. 15, 1998.
PHA 23,651, U.S. Ser. No. 09/287,160, filed: Apr. 6, 1999.
PHA 23,652, U.S. Ser. No. 09/287,161, filed: Apr. 6, 1999.

\* cited by examiner

Primary Examiner—Bhavesh Mehta
Assistant Examiner—Duy M Dang
(74) Attorney, Agent, or Firm—Russell Gross

(57) ABSTRACT

A RAM-based search engine for updating a horizontal sum representing the sum of the values of N pixels contained in a horizontal row of a reference pixel array during a motion estimation search during which the reference pixel array is displaced by one pixel in a horizontal search direction during each of a plurality of iterations of the motion estimation search. The RAM-based search engine includes a horizontal sum modifier circuit that accumulates the values of the N pixels contained in the horizontal row of the reference pixel array prior to any displacement of the reference pixel array to produce the horizontal sum, and that updates the horizontal sum by computing the new horizontal sum using the following equation:

$$OS_{NEW} = OS_{OLD} - a_{oo} + a_{no},$$

where $OS_{NEW}$ is the new horizontal sum after the last displacement of the reference pixel array by one pixel in the horizontal direction, $OS_{OLD}$ is the horizontal sum prior to the last displacement of the reference pixel array by one pixel in the horizontal direction, $a_{oo}$ is the pixel value of the pixel that was the horizontal origin of the reference pixel array prior to the last displacement of the reference pixel array by one pixel in the horizontal direction, and $a_{no}$ is the pixel value of the pixel that is the horizontal origin of the reference pixel array after the reference pixel array has been displaced by one pixel to the right with respect to the previous position of the reference pixel array as a result of the last displacement of the reference pixel array by one pixel in the horizontal direction.

30 Claims, 4 Drawing Sheets

RAM-BASED SEARCH ENGINE FOR ORTHOGONAL-SUM BLOCK MATCH MOTION ESTIMATION SYSTEM

BACKGROUND OF THE INVENTION

The present invention relates generally to digital video compression, and, more particularly, to a motion estimation search engine for a digital video encoder that is simpler, faster, and less expensive than the presently available technology permits.

Many different compression algorithms have been developed in the past for digitally encoding video and audio information (hereinafter referred to generically as "digital video data stream") in order to minimize the bandwidth required to transmit this digital video data stream for a given picture quality. Several multimedia specification committees have established and proposed standards for encoding/compressing and decoding/decompressing audio and video information. The most widely accepted international standards have been proposed by the Moving Pictures Expert Group (MPEG), and are generally referred to as the MPEG-1 and MPEG-2 standards. Officially, the MPEG-1 standard is specified in the ISO/IEC 11172-2 standard specification document, which is herein incorporated by reference, and the MPEG-2 standard is specified in the ISO/IEC 13818-2 standard specification document, which is also herein incorporated by reference. These MPEG standards for moving picture compression are used in a variety of current video playback products, including digital versatile (or video) disk (DVD) players, multimedia PCs having DVD playback capability, and satellite broadcast digital video. More recently, the Advanced Television Standards Committee (ATSC) announced that the MPEG-2 standard will be used as the standard for Digital HDTV transmission over terrestrial and cable television networks. The ATSC published the *Guide to the Use of the ATSC Digital Television Standard* on Oct. 4, 1995, and this publication is also herein incorporated by reference.

In general, in accordance with the MPEG standards, the audio and video data comprising a multimedia data stream (or "bit stream") are encoded/compressed in an intelligent manner using a compression technique generally known as "motion coding". More particularly, rather than transmitting each video frame in its entirety, MPEG uses motion estimation for only those parts of sequential pictures that vary due to motion, where possible. In general, the picture elements or "pixels" of a picture are specified relative to those of a previously transmitted reference or "anchor" picture using differential or "residual" video, as well as so-called "motion vectors" that specify the location of a 16-by-16 array of pixels or "macroblock" within the current picture relative to its original location within the anchor picture. Three main types of video frames or pictures are specified by MPEG, namely, I-type, P-type, and B-type pictures.

An I-type picture is coded using only the information contained in that picture, and hence, is referred to as an "intra-coded" or simply, "intra" picture.

A P-type picture is coded/compressed using motion compensated prediction (or "motion estimation") based upon information from a past reference (or "anchor") picture (either I-type or P-type), and hence, is referred to as a "predictive" or "predicted" picture.

A B-type picture is coded/compressed using motion compensated prediction (or "motion estimation") based upon information from either a past and or a future reference picture (either I-type or P-type), or both, and hence, is referred to as a "bidirectional" picture. B-type pictures are usually inserted between I-type or P-type pictures, or combinations of either.

The term "intra picture" is used herein to refer to I-type pictures, and the term "non-intra picture" is used herein to refer to both P-type and B-type pictures. It should be mentioned that although the frame rate of the video data represented by an MPEG bit stream is constant, the amount of data required to represent each frame can be different, e.g., so that one frame of video data (e.g., $\frac{1}{30}$ of a second of playback time) can be represented by x bytes of encoded data, while another frame of video data can be represented by only a fraction (e.g., 5%) of x bytes of encoded data. Since the frame update rate is constant during playback, the data rate is variable.

In general, the encoding of an MPEG video data stream requires a number of steps. The first of these steps consists of partitioning each picture into macroblocks. Next, in theory, each macroblock of each "non-intra" picture in the MPEG video data stream is compared with all possible 16-by-16 pixel arrays located within specified vertical and horizontal search ranges of the current macroblock's corresponding location in the anchor picture(s). This theoretical "full search algorithm" (i.e., searching through every possible block in the search region for the best match) always produces the best match, but is seldom used in real-world applications because of the tremendous amount of calculations that would be required, e.g., for a block size of N×N and a search region of (N+2w) by (N+2w), the distortion function MAE has to be calculated $(2w+1)^2$ times for each block, which is a tremendous amount of calculations. Rather, it is used only as a reference or benchmark to enable comparison of different more practical motion estimation algorithms that can be executed far faster and with far fewer computations. These more practical motion estimation algorithms are generally referred to as "fast search algorithms".

The aforementioned search or "motion estimation" procedure, for a given prediction mode, results in a motion vector that corresponds to the position of the closest-matching macroblock (according to a specified matching criterion) in the anchor picture within the specified search range. Once the prediction mode and motion vector(s) have been determined, the pixel values of the closest-matching macroblock are subtracted from the corresponding pixels of the current macroblock, and the resulting 16-by-16 array of differential pixels is then transformed into 8-by-8 "blocks," on each of which is performed a discrete cosine transform (DCT), the resulting coefficients of which are each quantized and Huffman-encoded (as are the prediction type, motion vectors, and other information pertaining to the macroblock) to generate the MPEG bit stream. If no adequate macroblock match is detected in the anchor picture, or if the current picture is an intra, or "I-" picture, the above procedures are performed on the actual pixels of the current macroblock (i.e., no difference is taken with respect to pixels in any other picture), and the macroblock is designated an "intra" macroblock.

For all MPEG-2 prediction modes, the fundamental technique of motion estimation consists of comparing the current macroblock with a given 16-by-16 pixel array in the anchor picture, estimating the quality of the match according to the specified metric, and repeating this procedure for every such 16-by-16 pixel array located within the search range. The hardware or software apparatus that performs this search is usually termed the "search engine," and there exists a number of well-known criteria for determining the quality of the match. Among the best-known criteria are the Minimum Absolute Error (MAE), in which the metic consists of the sum of the absolute values of the differences of each of the 256 pixels in the macroblock with the corresponding pixel in the matching anchor picture macroblock; and the Minimum Square Error (MSE), in which the metric consists of the sum of the squares of the above pixel differences. In either case, the match having the smallest value of the corresponding sum is selected as the best match within the specified search range, and its horizontal and vertical positions relative to the current macroblock therefore constitute the motion vector. If the resulting minimum sum is nevertheless deemed too large, a suitable match does not exist for the current macroblock, and it is coded as an intra macroblock. For the purposes of the present invention, either of the above two criteria, or any other suitable criterion, may be used.

The various fast search algorithms evaluate the distortion function (e.g., the MAE function) only at a predetermined subset of the candidate motion vector locations within the search region, thereby reducing the overall computational effort. These algorithms are based on the assumption that the distortion measure is monotonically decreasing in the direction of the best match prediction. Even though this assumption is not always true, it can still find a suboptimal motion vector with much less computation.

The most commonly used approach to motion estimation is a hybrid approach generally divided into several processing steps. First, the image can be decimated by pixel averaging. Next, the fast search algorithm operating on a smaller number of pixels is performed, producing a result in the vicinity of the best match. Then, a full search algorithm in a smaller search region around the obtained motion vector is performed. If half-pel vectors are required (as with MPEG-2), a half-pel search is performed as a separate step or is combined with the limited full search.

Even with the great savings that can be achieved in the hybrid approach to motion estimation, an enormous amount of computations still have to be performed for each iteration of computing MAE. Assuming that the distortion function has to be computed every clock cycle for every block offset, which is desirable in demanding applications such as MPEG-2 HDTV where motion block size is 16-by-16, a distortion function computational unit (DFCU) will consist of a number of simpler circuits of increasing bit width starting from 8 (8-bit luminance data is used for motion estimation) to produce MAE. This number will be equal to the sum of the following: 256 subtraction circuits, 256 absolute value compute circuits, 255 summation circuits of increasing bit width, for a total of 757 circuits of increasing bit width starting with 8, per DFCU.

Depending on picture resolution, a number of these extremely complex units will be required for a practical system. Using a smaller number of circuits within a DFCU in order to reuse its hardware is possible, but will substantially increase processing time and may not be acceptable in demanding applications such as HDTV. In this case, the number of DFCUs will to simply have to be increased to compensate by enhanced parallel processing.

The first step in the hybrid approach to motion estimation (rough search) is usually the most demanding step in terms of hardware utilization because it has to cover the largest search region in order to produce a reasonably accurate match.

Based on the above and foregoing, there presently exists a need in the art for a method for motion estimation that enhances the speed at which motion estimation can be performed, that greatly reduces the amount and complexity of the motion estimation or DFCU hardware required to perform motion estimation, and that provides for significant picture quality improvement at a reasonable cost.

The motion estimation method disclosed by the present inventor in co-pending application Ser. No. 09/287,161, filed concurrently herewith, and entitled "Motion Estimation Method Using Orthogonal-Sum Block Matching", produces a much smaller amount of data that has to be compared in order to identify a best match, and leads to a substantial reduction in the motion estimation search engine hardware requirements, by searching for best matches by comparing unique macroblock signatures rather than by comparing the individual luminance values of the collocated pixels in the current macroblock and the search region. However, this inventive method does not directly address the problem of accelerating the motion estimation search procedure. For example, this motion estimation method using orthogonal-sum block matching involves a separate computation of the orthogonal sums for each macroblock position within the anchor (reference) picture.

The method and device of the present invention greatly reduces the computational requirements and significantly accelerates the motion estimation search by storing in a local memory and extensively reusing previously computed (available) sums to produce the orthogonal sums, thereby also significantly reducing the the motion estimation search engine hardware requirements. Further, the local memory can advantageously be a RAM, e.g., a DRAM or SRAM, as opposed to being implemented as a matrix of shift registers, as is necessary with the presently available technology. However, although this constitutes a novel and presently preferred feature of the present invention, in one of its aspects, this is not in and of itself an essential feature of the present invention, in its broadest sense, as will become fully apparent hereinafter.

SUMMARY OF THE INVENTION

The present invention encompasses, in one of its aspects, a method for updating a horizontal sum representing the sum of the values of N pixels contained in a horizontal row of a reference pixel array during a motion estimation search, the method including the steps of computing the horizontal sum; displacing the reference pixel array by one pixel in a horizontal direction; and, updating the horizontal sum to produce a new horizontal sum by adding a new pixel value to the previously-computed horizontal sum, and subtracting an old pixel value no longer contained in the horizontal row of the reference pixel array after the displacing step, from the previously-computed horizontal sum. The displacing and updating steps are preferably repeated until a limit of a horizontal search range is reached. In an exemplary embodiment, the step of computing is performed by using a horizontal sum modifier circuit that accumulates the values of the N pixels contained in the horizontal row of the reference pixel array prior to performing the step of displacing, and the step of updating the horizontal sum is performing by using the horizontal sum modifier circuit to compute the new horizontal sum using the following equation:

$$OS_{NEW} = OS_{OLD} - a_{00} + a_{no},$$

where $OS_{NEW}$ is the new horizontal sum, $OS_{OLD}$ is the horizontal sum prior to the last iteration of the displacing step, $a_{00}$ is the pixel value of the pixel that was the horizontal origin of the reference pixel array prior to the last iteration of the displacing step, and $a_{no}$ is the pixel value of the pixel that is the horizontal origin of the reference pixel array after the reference pixel array has been displaced by one pixel to the right with respect to the previous position of the reference pixel array as a result of the last iteration of the displacing step.

The present invention, in another of its aspects, encompasses a method for generating a horizontal sum for each of N rows of a reference pixel array and for simultaneously generating a vertical sum for each of M columns of the reference pixel array for each iteration of a horizontal motion estimation search of a prescribed search region of a reference picture, the method including the steps of:

(a) storing initial pixel values corresponding to an initial position of the reference pixel array by storing M individual pixel values in each of N rows of a memory and storing N individual pixel values in each of M columns of the memory;

(b) computing the horizontal sum for each of the N rows of the initial position of the reference pixel array and storing each of the computed horizontal sums;

(c) computing the vertical sum for each of the M columns of the initial position of the reference pixel array and storing the computed vertical sums in a shift register;

(d) displacing the reference pixel array by one pixel in a horizontal direction;

(e) in response to the displacing step:

i) providing N new pixel values, one for each of the N rows of the reference pixel array corresponding to a last column of the reference pixel array after being displaced by one pixel in the horizontal direction;

ii) summing the N new pixel values to produce a new vertical sum, and applying the new vertical sum to the shift register, and shifting the previously-stored vertical sums by one word in the horizontal direction of the motion estimation search, whereby a first-stored vertical sum is discarded and the new vertical sum is stored in the former storage location of a last-stored vertical sum;

iii) outputting a set of M new vertical sums from the shift register;

iv) updating each of the horizontal sums to produce a set of N new horizontal sums by adding the respective one of the N new pixel values to the previously-computed horizontal sum for each of the N rows, and by subtracting respective old pixel values no longer contained in the M columns of the reference pixel array after being displaced by one pixel in the horizontal direction from the previously-computed horizontal sum for each of the N rows; and, v) outputting the set of N new horizontal sums.

Steps (d) and (e) are preferably repeated until a limit of a horizontal search range is reached. In an exemplary embodiment, step (b) is performed by using N horizontal sum modifier circuits corresponding to respective ones of the N rows of the memory, whereby each of the horizontal sum modifier circuits accumulates the values of the M individual pixel values stored in the respective row of the memory, and step (e) iv) is performed by using the horizontal sum modifier circuits to compute the new horizontal sums for the respective rows of the reference pixel array using the following equation:

$$OS_{NEWi} = OS_{OLDi} - a_{00i} + a_{noi},$$

where $OS_{NEWi}$ is the new horizontal sum for the respective row of the reference pixel array after the last iteration of the displacing step, $OS_{OLDi}$ is the horizontal sum for the respective row of the reference pixel array prior to the last iteration of the displacing step, $a_{00i}$ is the pixel value of the first pixel of the respective row of the reference pixel array prior to the last iteration of the displacing step, and $a_{noi}$ is the pixel value of the last pixel of the respective row of the reference pixel array after the reference pixel array has been displaced by one pixel to the right with respect to the previous position of the reference pixel array as a result of the last iteration of the displacing step.

The present invention, in another of its aspects, encompasses a device for updating a horizontal sum representing the sum of the values of N pixels contained in a horizontal row of a reference pixel array during a motion estimation search during which the reference pixel array is displaced by one pixel in a horizontal search direction during each of a plurality of iterations of the motion estimation search, the device including a horizontal sum modifier circuit that accumulates the values of the N pixels contained in the horizontal row of the reference pixel array prior to any displacement of the reference pixel array to produce the horizontal sum, and that updates the horizontal sum by computing the new horizontal sum using the following equation:

$$OS_{NEW} = OS_{OLD} - a_{00} + a_{no},$$

where $OS_{NEW}$ is the new horizontal sum after the last displacement of the reference pixel array by one pixel in the horizontal direction, $OS_{OLD}$ is the horizontal sum prior to the last displacement of the reference pixel array by one pixel in the horizontal direction, $a_{00}$ is the pixel value of the pixel that was the horizontal origin of the reference pixel array prior to the last displacement of the reference pixel array by one pixel in the horizontal direction, and $a_{no}$ is the pixel value of the pixel that is the horizontal origin of the reference pixel array after the reference pixel array has been displaced by one pixel to the right with respect to the previous position of the reference pixel array as a result of the last displacement of the reference pixel array by one pixel in the horizontal direction.

The present invention, in yet another of its aspects, encompasses a RAM-based orthogonal-sum generator and a motion estimation search engine that implement the above-described methods of the present invention.

BRIEF DESCRIPTION OF THE DRAWINGS

These and other objects, features, and advantages of the present invention will be readily understood from the following detailed description taken in conjunction with the accompanying drawings, in which.

DETAILED DESCRIPTION OF THE INVENTION

Figure 1:
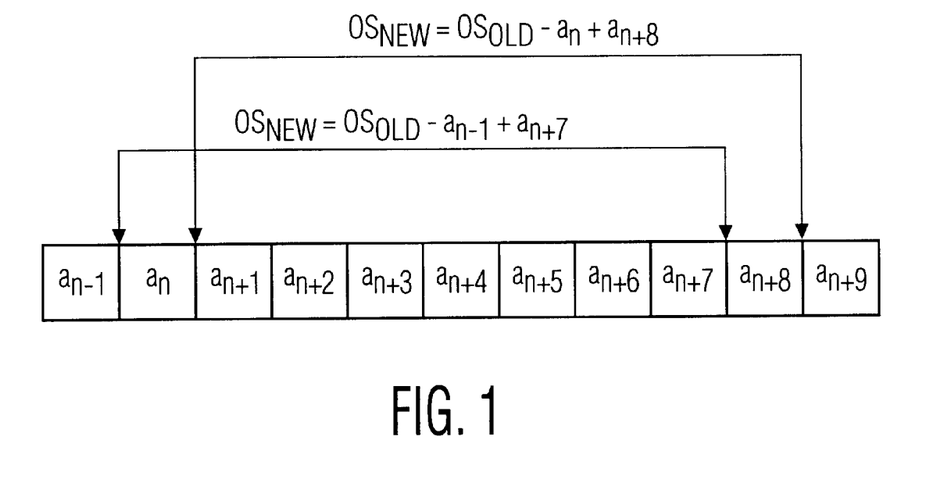
FIG. 1 is a diagram that depicts the basic methodology of the present invention, in the context of an orthogonal-sum update in a horizontal motion estimation search.

With reference now to FIG. 1, the fundamental principle of the present invention will now be described. More particularly, in order to compute a horizontal (orthogonal) sum ($OS_{NEW}$) for an 8-pixel wide macroblock displaced by one pixel to the right with respect to a previous 8-pixel wide macroblock whose horizontal (orthogonal) sum ($OS_{OLD}$) was previously computed during a previous iteration of a horizontal search, the following equation (1) is used:

$$OS_{NEW} = OS_{OLD} - a_{00} + a_{no}, \quad (1)$$

where $a_{00}$ is the pixel value of the pixel that was the horizontal origin of the previous macroblock, and $a_{no}$ is the pixel value of the pixel that is the horizontal origin of the "new" macroblock, i.e., the macroblock displaced by one pixel to the right with respect to the previous macroblock.

For example, assuming the horizontal origin of the previous macroblock was the pixel labeled $a_{n-1}$, so that the horizontal origin of the macroblock displaced by one pixel to the right is the pixel labeled $a_n$, then, using equation (1), $OS_{NEW} = OS_{OLD} - a_{n-1} + a_{n+7}$.

In other words, since pixel $a_{n+7}$ is the only pixel that is contained in the new macroblock that was not contained in the previous macroblock, due to the one-pixel displacement to the right, then its value must be added to the previously-computed orthogonal sum $OS_{OLD}$ in computing $OS_{NEW}$, and since the pixel $a_{n-1}$ is the only pixel that is not contained in the new macroblock but was contained in the previous macroblock, due to the one-pixel displacement to the right, then its value must be subtracted from the previously-computed orthogonal sum $OS_{OLD}$ in computing $OS_{NEW}$.

Similarly, as the horizontal search proceeds with an additional one-pixel displacement to the right, then the horizontal origin of the previous macroblock becomes the pixel labeled $a_n$, so that the horizontal origin of the "new" macroblock displaced by one pixel to the right becomes the pixel labeled $a_{n+1}$, then, using equation (1), $OS_{NEW} = OS_{OLD} - a_{n-1} + a_{n+7}$.

In other words, since pixel $a_{n+7}$ is the only pixel that is contained in the new macroblock that was not contained in the previous macroblock, due to the additional one-pixel displacement to the right, then its value must be added to the previously-computed orthogonal sum $OS_{OLD}$ in computing $OS_{NEW}$, and since the pixel $a_{n-1}$ is the only pixel that is not contained in the new macroblock but was contained in the previous macroblock, due to the additional one-pixel displacement to the right, then its value must be subtracted from the previously-computed orthogonal sum $OS_{OLD}$ in computing $OS_{NEW}$.

This procedure for updating the value of the orthogonal sum $OS_{NEW}$ is repeated for each additional one-pixel displacement during the horizontal search until the limit of the horizontal search range within the search region of the reference picture is reached, at which time, the horizontal search for that row of the search region is completed.

Figure 2:
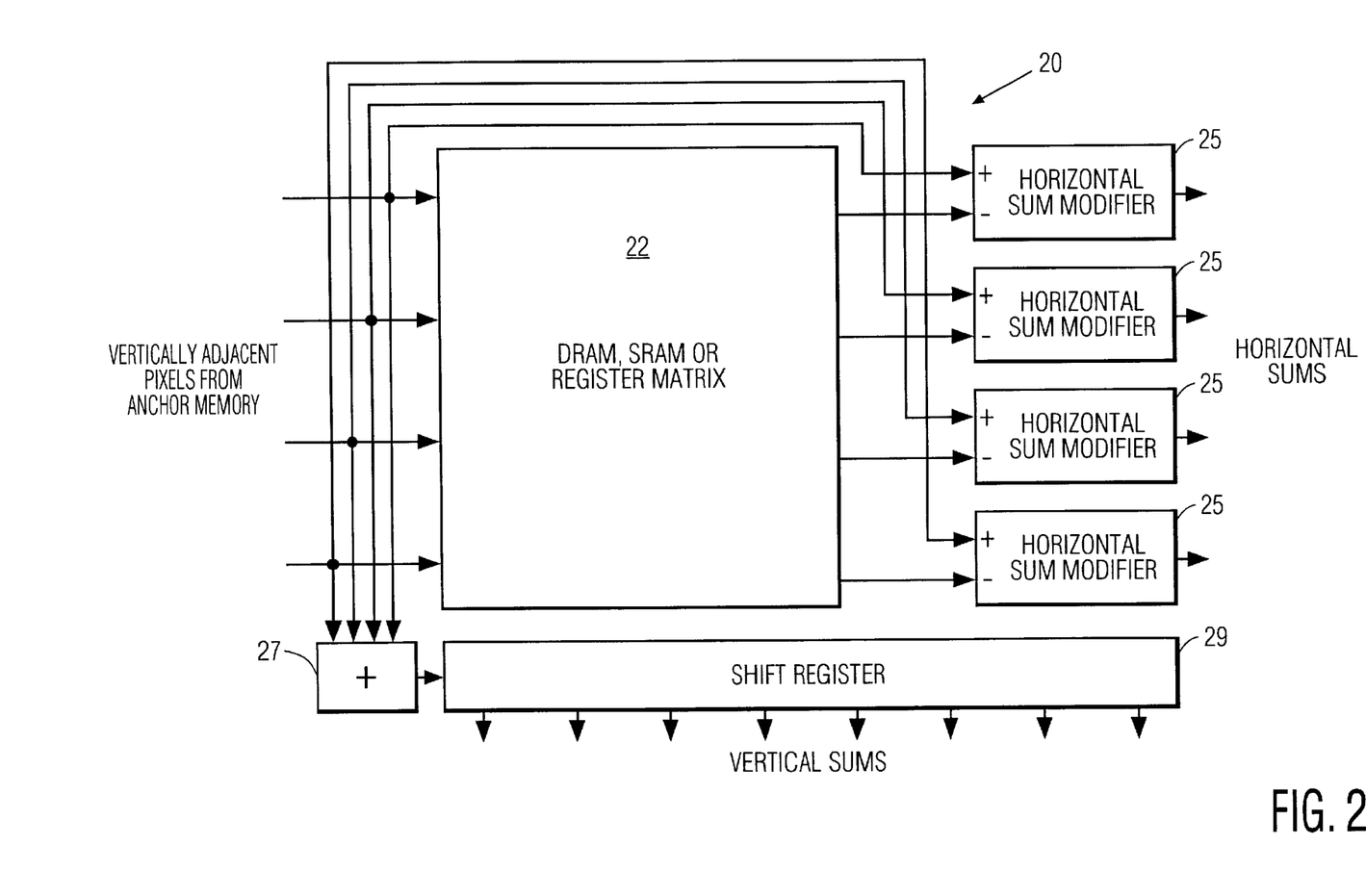
FIG. 2 is a block diagram of an orthogonal-sum generator that constitutes an exemplary embodiment of the present invention.

With reference now to FIG. 2, there can be seen a block diagram of an orthogonal-sum generator 20 that constitutes an exemplary embodiment of the present invention. At the outset, it should be recognized that although the invention is described using the example of an 8×4 macroblock, the present invention is not limited to macroblocks or pixel arrays of any particular size or structure. The motion estimation method of the present invention will now be described in conjunction with the orthogonal-sum generator 20 depicted in FIG. 2, although it should be appreciated that other hardware implementations of the method of the present invention will become readily apparent to those of ordinary skill in the pertinent art, and thus, are encompassed by the present invention, in its broadest sense.

First, a full orthogonal-sum signature of a macroblock currently being encoded ("coded macroblock") is computed by computing a set of horizontal sums representative of the sums of the individual pixel (luminance) values of the rows of that macroblock and a set of vertical sums representative of the sums of the individual pixel values of the columns of that macroblock, in the manner disclosed in co-pending application Ser. No. 09/287,161 the disclosure of which is herein incorporated by reference.

Second, an initialization procedure is executed by loading/writing into a local memory 22 (e.g., a DRAM, SRAM, or shift register matrix) the pixel values for a macroblock-sized initial reference pixel array (macroblock) having a specified origin in a specified search region of a reference picture stored in a reference picture (anchor) memory (not shown). The anchor memory is preferably organized in such a manner that its outputs are always adjacent vertically. For example, if the outputs of the anchor memory produce pixels from lines (rows) 1, 2, 3, and 4, then a one-pixel vertical displacement down will cause the anchor memory to produce pixels from lines (rows) 2, 3, 4, and 5. This can be achieved, for example, by appropriate partitioning of the anchor memory without increasing its size using a method described in co-pending U.S. application Ser. No. 09/094,828 entitled "Pixel Data Storage System For Use In Half-Pel Interpolation", in the names of Michael Bakhmutsky and Karl Wittig, and assigned to the assignee of the present invention, the disclosure of which is herein incorporated by reference.

During the initialization procedure, the full set of horizontal sums for the initial macroblock-sized reference pixel array are accumulated in a set of parallel horizontal sum modifier circuits 25 each having a subtract (−) input coupled to respective data outputs of the local memory 22; simultaneously (preferably), the vertical sums for each column of the initial reference pixel array are produced by a four-input vertical sum adder circuit 27, and the thusly-computed vertical sums are sequentially loaded into a shift register 29.

After this initialization procedure is completed, the motion estimation search method of the present invention works as follows. More particularly, as the motion estimation search proceeds pixel-by-pixel in the horizontal direction through the specified search region of the reference picture (hereinafter referred to as a "horizontal search"), the resultant reference pixel array will be correspondingly displaced by one pixel to the right with respect to the initial reference pixel array.

After each one pixel displacement within the search region, the pixel values stored in each row of the ith column of the local memory 22 are read out of the local memory 22 and applied to the subtract input of the respective horizontal sum modifier circuit 25, and the pixel values corresponding to the (N+i)th column of the search region of the reference picture are written into the respective rows of the ith column of the local memory 22 to replace the pixel values just read therefrom, where i=1 through N, and N is the horizontal dimension of the initial reference pixel array (i.e., the horizontal dimension of the coded macroblock). Preferably, after N is reached, for memory addressing purposes, i will wrap back to a count of 1, and will be incremented by 1 until N is reached again, and the cycle repeated until the limit of the horizontal search range (as measured from the horizontal origin of the initial reference pixel array) has been reached and the horizontal search thus concluded. In this connection, a modulo-8 address counter (not shown) or other suitable mechanism can be utilized for performing this function.

The pixel values corresponding to the (N+i)th column of the search region of the reference picture (hereinafter referred to simply as the "new pixel values") are also simultaneously applied to an add (+) input of the respective horizontal sum modifier circuits 25, and to respective inputs of the vertical sum adder circuit 27. By way of example, if the local memory 22 is a DRAM, the memory read and write operations described above can be performed during a single memory clock cycle via a read-modify-write operation.

Upon receiving the read-out and new pixel values, each of the horizontal sum modifier circuits 25 adds the new pixel value it received at its add input to the previously-accumulated horizontal sum, and subtracts the read-out pixel value it received at its subtract input from the previously-accumulated horizontal sum, and outputs the resultant sum as a "new" horizontal sum. That is, the set of horizontal sums produced at the outputs of the horizontal sum modifier circuits 25 will constitute the set of horizontal sums for the "new" reference pixel array that is displaced by one pixel from the reference pixel array of the previous iteration.

Also, after each one pixel displacement, the shift register 29 is shifted horizontally by one word to the right, so that the vertical sum stored in its last stage is discarded, and the remaining vertical sums are shifted by one stage to the right. Upon receiving the new pixel values, the vertical sum adder circuit 27 produces at its output a "new" vertical sum that is loaded into the first stage of the shift register 29 (which is an N-word shift register) to replace the previous vertical sum that was shifted to the right. The resultant set of vertical sums that appear at the outputs of the shift register 29 constitute the set of vertical sums for the "new" reference pixel array that is displaced by one pixel from the reference pixel array of the previous iteration.

The above-described procedure is repeated after each one pixel displacement during the horizontal search through the search region of the reference picture until the horizontal search is concluded.

Figure 3:
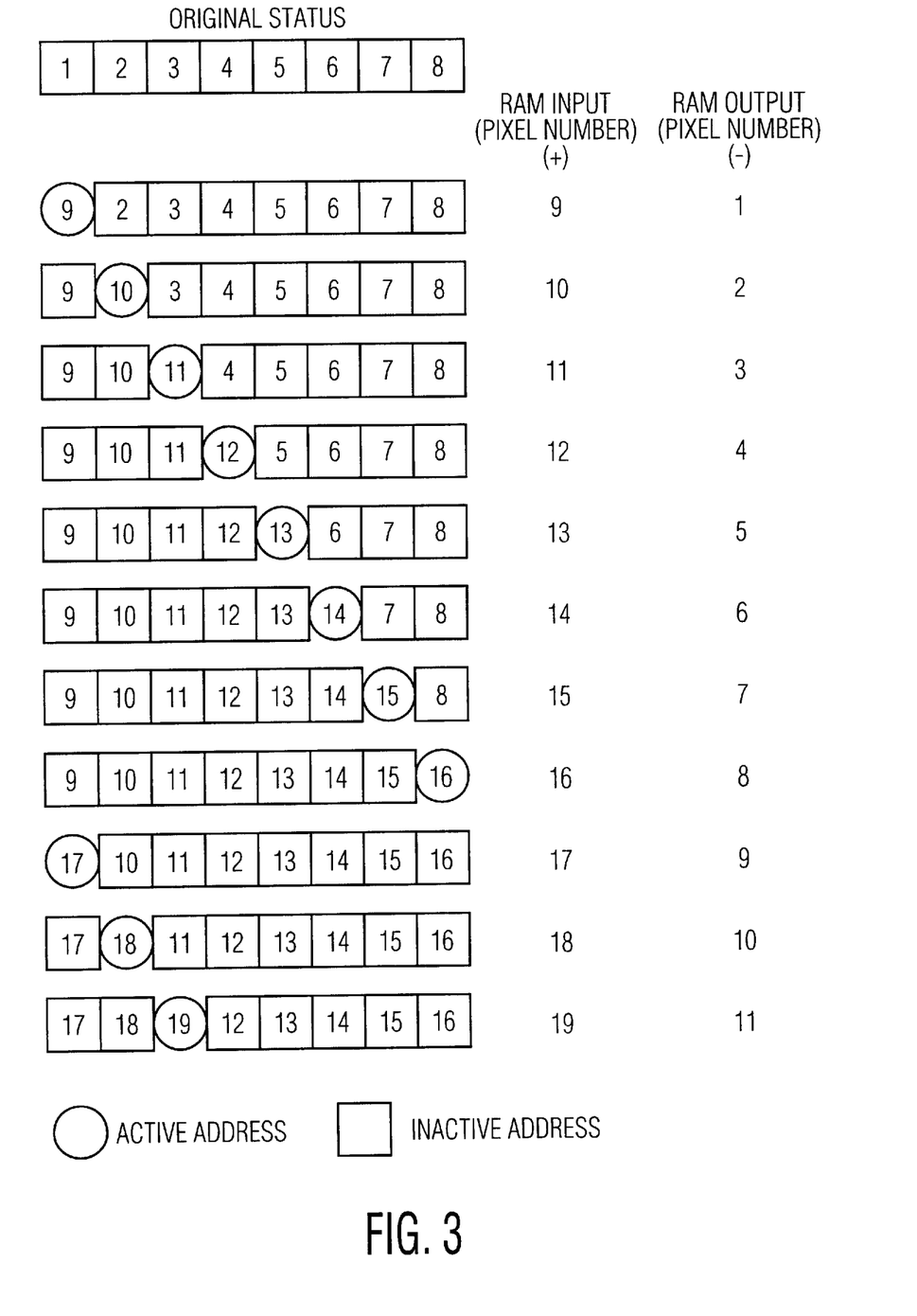
FIG. 3 is a diagram that illustrates the sequence of RAM operations in an illustrative horizontal motion estimation search using the methodology of the present invention; and, FIG. 4 is a block diagram of a motion estimation search engine that constitutes an exemplary embodiment of the present invention.

With reference now to FIG. 3, the sequence of memory read/write operations for an exemplary horizontal search in accordance with the exemplary embodiment of the present invention will now be described. More particularly, after the first eight (8) horizontally adjacent pixels 1 through 8 for each row of the reference picture search region being searched are stored in the four respective rows (sections) of the local memory 22, and, simultaneously, are accumulated in the corresponding horizontal sum modifier circuits 25. At this point, the horizontal sums output by the horizontal sum modifier circuits 25 are the valid horizontal sums for the initial reference pixel array (macroblock). Then, for each single-pixel displacement, as the horizontal search through the search region of the reference picture proceeds, the address counter is incremented by one to point to pixel i, where i=1 through 8, with the count repeating after the terminal count (8) is reached, thereby causing the old pixel value for each row of the local memory 22 to be read out of the currently addressed location in the local memory 22 and be applied to the subtract (−) input of the respective horizontal sum modifier circuit 25, and the new pixel value for each row of the local memory 22 to be written into the currently addressed location in the local memory 22 and simultaneously applied to the add (+) input of the respective horizontal sum modifier circuit 25 and the respective input of the four-input vertical sum adder circuit 27. Thus, after each single-pixel displacement, the updated full set of horizontal sums will be output by the horizontal sum modifier circuits 25 and the updated full set of vertical sums will be output by the shift register 29.

For example, as can be seen diagrammatically in FIG. 3, after the first 8 pixels are written into the appropriate row of the local memory 22, the reference pixel array will be displaced by one pixel to the right, and pixel number 1 will be read out of the local memory 22 and replaced by pixel number 9; next, the reference pixel array will be displaced by one pixel to the right, and pixel number 2 will be read out of the local memory 22 and replaced by pixel number 10; next, the reference pixel array will be displaced by one pixel to the right, and pixel number 3 will be read out of the local memory 22 and replaced by pixel number 11; next, the reference pixel array will be displaced by one pixel to the right, and pixel number 4 will be read out of the local memory 22 and replaced by pixel number 12; next, the reference pixel array will be displaced by one pixel to the right, and pixel number 5 will be read out of the local memory 22 and replaced by pixel number 13; next, the reference pixel array will be displaced by one pixel to the right, and pixel number 6 will be read out of the local memory 22 and replaced by pixel number 14; next, the reference pixel array will be displaced by one pixel to the right, and pixel number 7 will be read out of the local memory 22 and replaced by pixel number 15; next, the reference pixel array will be displaced by one pixel to the right, and pixel number 8 will be read out of the local memory 22 and replaced by pixel number 16; next, the reference pixel array will be displaced by one pixel to the right, and pixel number 9 will be read out of the local memory 22 and replaced by pixel number 17; next, the reference pixel array will be displaced by one pixel to the right, and pixel number 10 will be read out of the local memory 22 and replaced by pixel number 18; and, finally, the reference pixel array will be displaced by one pixel to the right, and pixel number 11 will be read out of the local memory 22 and replaced by pixel number 19, etc.

Figure 4:
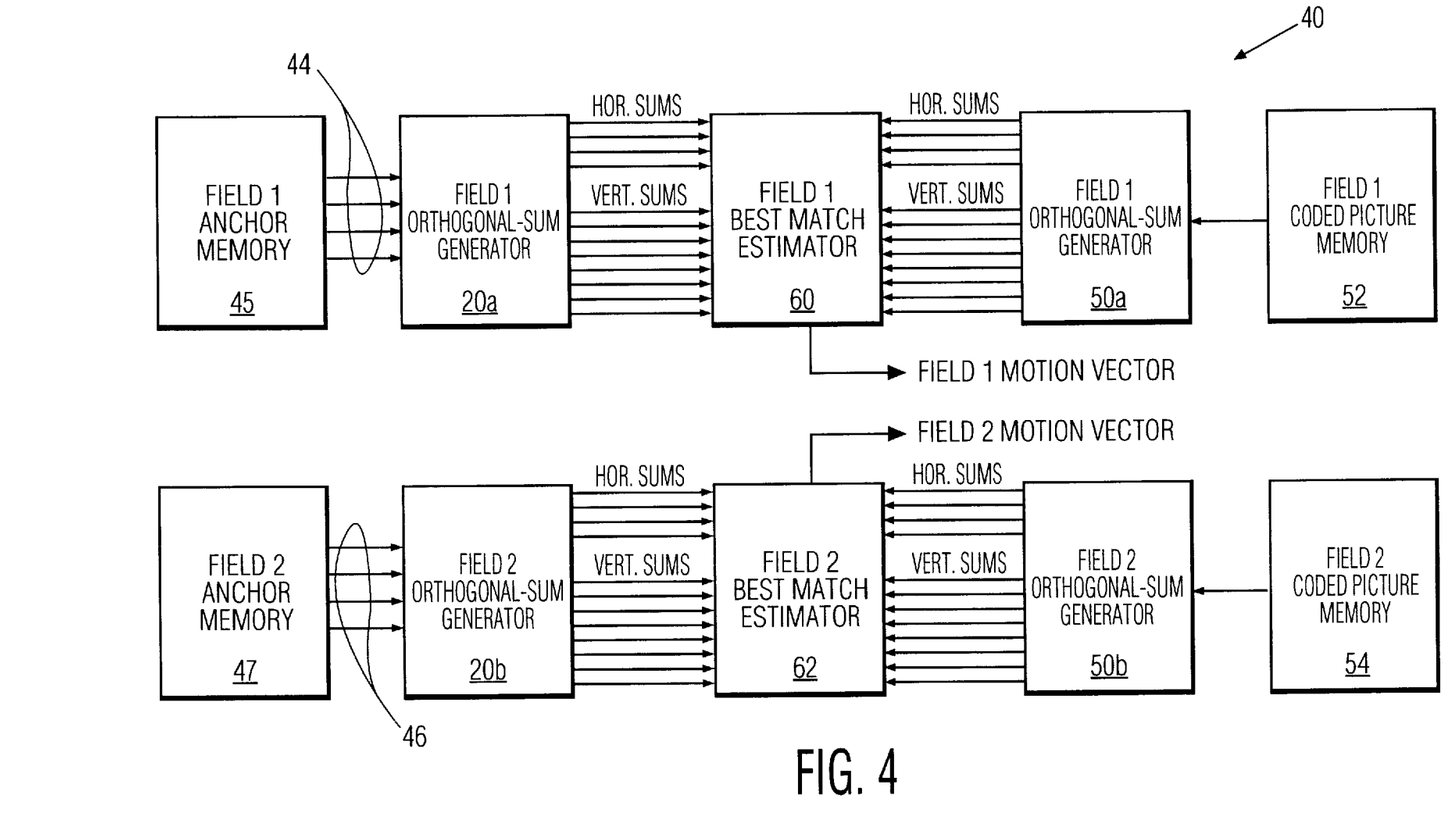

With reference now to FIG. 4, there can be seen a block diagram of a field-based motion estimation search engine 40 that constitutes an exemplary implementation of the present invention. As can be seen, the search engine 40 includes a Field 1 orthogonal-sum generator 20a (like the one depicted in FIG. 2) and a parallel Field 2 orthogonal-sum generator 20b (like the one depicted in FIG. 2). The Field 1 orthogonal-sum generator 20a receives four new pixels over parallel lines 44 from a Field 1 anchor memory 45 upon each one pixel displacement of a Field 1 reference pixel array during a horizontal search operation, and the Field 2 orthogonal-sum generator 20b receives four new pixels over parallel lines 46 from a Field 2 anchor memory 47 upon each one pixel displacement of a Field 2 reference pixel array during a horizontal search operation. A Field 1 orthogonal-sum generator 50a receives the pixels of a Field 1 macroblock currently being encoded (i.e., coded macroblock) from a Field 1 coded picture memory 52, and a Field 2 orthogonal-sum generator 50b receives the pixels of a Field 2 coded macroblock from a Field 2 coded picture memory 54. The Field 1 orthogonal-sum generator 50a produces at its outputs the full set of orthogonal sums (both horizontal and vertical) representing the orthogona-sum signature of the Field 1 coded macroblock, and the Field 2 orthogonal-sum generator 50b produces at its outputs the full set of orthogonal sums representing the orthogonal-sum signature of the Field 2 coded macroblock.

With continuing reference to FIG. 4, the search engine 40 further includes a Field 1 best match estimator 60 that receives at one set of inputs the orthogonal-sum signature of the current reference pixel array, and at another set of inputs the orthogonal-sum signature of the Field 1 coded macroblock, and then determines, in accordance with a prescribed search metric (e.g., MAE), which of the reference pixel arrays from the specified search region of the Field 1 anchor memory 45 constitutes the best match for the coded macroblock, and outputs the result as the "Field 1 Motion Vector". Similarly, the search engine 40 further includes a Field 2 best match estimator 62 that receives at one set of inputs the orthogonal-sum signature of the current reference pixel array, and at another set of inputs the orthogonal-sum signature of the Field 2 coded macroblock, and then determines, in accordance with a prescribed search metric (e.g., MAE), which of the reference pixel arrays from the specified search region of the Field 2 anchor memory 47 constitutes the best match for the coded macroblock, and outputs the result as the "Field 2 Motion Vector". It should be readily appreciated that for a more efficient design implementation, the search engine RAMs can be combined to store data for both fields, since these RAMs are controlled in the identical way for both fields.

As stated previously, the computational complexity of the DFCU is a major factor in the cost of the motion estimation circuitry (search engine). However, since the motion estimation method of the present invention provides such a dramatic reduction in the cost and complexity of the DFCU, it becomes much more practical to start with undecimated or low-level decimated video for motion estimation searching, thereby dramatically improving motion estimation search accuracy, and ultimately, picture quality. In this connection, not only does the motion estimation method of the present invention allow a substantial reduction in the number of stages of motion estimation, but it also allows for the elimination of the special video filtering circuitry required for all eliminated decimation stages. With such hardware savings, the search process can potentially be started with the undecimated video producing a great quality improvement at reasonable cost.

Another advantage realized with the motion estimation method of the present invention is greatly enhanced speed of operation. Traditionally, multiple stages of logic are required in order to compare collocated luminance magnitudes, practically excluding the possibility of obtaining results in a single clock cycle. For this reason, either the system clock frequency has to be substantially reduced or the system has to be pipelined utilizing substantial logic resources.

In addition to these advantages, the invention greatly accelerates the motion estimation method using orthogonal-sum block matching disclosed in the previously referenced co-pending U.S. application Ser. No. 09/287,161. Moreover, the present invention achieves the following three significant advantages over the presently available technology:

(1) Substantial hardware reduction in orthogonal-sum computations. Since the orthogonal sums are updated with the macroblock displacements in the anchor picture using the available sums to produce the new (updated) orthogonal sums, a much smaller computational effort requiring significantly lesser computational hardware is made possible;

(2) A long chain of adder circuits to produce the orthogonal sums is eliminated, thereby substantially accelerating the speed of operation;

(3) The present invention enables the usage of RAMs to store the search data rather than the usage of a massive register matrix to store the search data, as is required by the presently available technology, which requires that all of the engine memory's outputs be immediately available for comparison, thereby providing substantial cost savings; and, (4) Due to its novel architecture, a motion estimation search engine according to the present invention can be implemented with logic and memory integrated into a single silicon device using emerging embedded memory technologies in order to thereby enhance system performance due to wider internal bus widths, among other things.

Although preferred embodiments of the present invention have been described in detail hereinabove, it should be clearly understood that many variations and/or modifications of the basic inventive concepts taught herein that may appear to those skilled in the pertinent art will still fall within the spirit and scope of the present invention, as defined in the appended claims.

What is claimed is:

1. A method for updating a horizontal sum representing the sum of the values of N pixels contained in a horizontal row of a reference pixel array during a motion estimation search, the method including the steps of:

computing the horizontal sum;

displacing the reference pixel array by one pixel in a horizontal direction; and, updating the horizontal sum to produce a new horizontal sum by adding a new pixel value to the previously-computed horizontal sum, and subtracting an old pixel value no longer contained in the horizontal row of the reference pixel array after the displacing step, from the previously-computed horizontal sum.

2. The method as set forth in claim 1, further including the step of repeating the displacing and updating steps until a limit of a horizontal search range is reached.

3. The method as set forth in claim 1, further including the step of repeating the displacing and updating steps.

4. The method as set forth in claim 3, wherein:

the step of computing is performed by using a horizontal sum modifier circuit that accumulates the values of the N pixels contained in the horizontal row of the reference pixel array prior to performing the step of displacing; and, the step of updating the horizontal sum is performing by using the horizontal sum modifier circuit to compute the new horizontal sum using the following equation:

$$OS_{NEW} = OS_{OLD} - a_{00} + a_{no},$$

where $OS_{NEW}$ is the new horizontal sum, $OS_{OLD}$ is the horizontal sum prior to the last iteration of the displacing step, $a_{00}$ is the pixel value of the pixel that was the horizontal origin of the reference pixel array prior to the last iteration of the displacing step, and $a_{no}$ is the pixel value of the pixel that is the horizontal origin of the reference pixel array after the reference pixel array has been displaced by one pixel to the right with respect to the previous position of the reference pixel array as a result of the last iteration of the displacing step.

5. A device that implements the method set forth in claim 4.

6. The method as set forth in claim 1, wherein the reference pixel array is located in a prescribed search region of a reference picture.

7. The method as set forth in claim 1, wherein the reference pixel array has a size and structure defined by an MPEG standard.

8. The method as set forth in claim 1, wherein the method is implemented by a motion estimation search engine of a digital video encoder.

9. A device that implements the method set forth in claim 1.

10. A method for generating a horizontal sum for each of N rows of a reference pixel array and for simultaneously generating a vertical sum for each of M columns of the reference pixel array for each iteration of a horizontal motion estimation search of a prescribed search region of a reference picture, the method including the steps of:

(a) storing initial pixel values corresponding to an initial position of the reference pixel array by storing M individual pixel values in each of N rows of a memory and storing N individual pixel values in each of M columns of the memory;

(b) computing the horizontal sum for each of the N rows of the initial position of the reference pixel array and storing each of the computed horizontal sums;

(c) computing the vertical sum for each of the M columns of the initial position of the reference pixel array and storing the computed vertical sums in a shift register;

(d) displacing the reference pixel array by one pixel in a horizontal direction;

(e) in response to the displacing step:

i) providing N new pixel values, one for each of the N rows of the reference pixel array corresponding to a last column of the reference pixel array after being displaced by one pixel in the horizontal direction;

ii) summing the N new pixel values to produce a new vertical sum, and applying the new vertical sum to the shift register, and shifting the previously-stored vertical sums by one word in the horizontal direction of the motion estimation search, whereby a first-stored vertical sum is discarded and the new vertical sum is stored in the former storage location of a last-stored vertical sum;

iii) outputting a set of M new vertical sums from the shift register;

iv) updating each of the horizontal sums to produce a set of N new horizontal sums by adding the respective one of the N new pixel values to the previously-computed horizontal sum for each of the N rows, and by subtracting respective old pixel values no longer contained in the M columns of the reference pixel array after being displaced by one pixel in the horizontal direction from the previously-computed horizontal sum for each of the N rows; and, v) outputting the set of N new horizontal sums.

11. The method as set forth in claim 10, further including the step of repeating steps (d) and (e) until a limit of a horizontal search range is reached.

12. The method as set forth in claim 10, further including the step of repeating steps (d) and (e).

13. The method as set forth in claim 12, wherein step (b) is performed by using N horizontal sum modifier circuits corresponding to respective ones of the N rows of the memory, whereby each of the horizontal sum modifier circuits accumulates the values of the M individual pixel values stored in the respective row of the memory.

14. The method as set forth in claim 13, wherein step (e) iv) is performed by using the horizontal sum modifier circuits to compute the new horizontal sums for the respective rows of the reference pixel array using the following equation:

$$OS_{NEWi} = OS_{OLDi} - a_{00i} + a_{noi},$$

where $OS_{NEWi}$ is the new horizontal sum for the respective row of the reference pixel array after the last iteration of the displacing step, $OS_{OLDi}$ is the horizontal sum for the respective row of the reference pixel array prior to the last iteration of the displacing step, $a_{00i}$ is the pixel value of the first pixel of the respective row of the reference pixel array prior to the last iteration of the displacing step, and $a_{noi}$ is the pixel value of the last pixel of the respective row of the reference pixel array after the reference pixel array has been displaced by one pixel to the right with respect to the previous position of the reference pixel array as a result of the last iteration of the displacing step.

15. The method as set forth in claim 12, wherein step (e) iv) is performed by computing the new horizontal sums for the respective rows of the reference pixel array using the following equation:

$$OS_{NEWi} = OS_{OLDi} - a_{00i} + a_{noi},$$

where $OS_{NEWi}$ is the new horizontal sum for the respective row of the reference pixel array after the last iteration of the displacing step, $OS_{OLDi}$ is the horizontal sum for the respective row of the reference pixel array prior to the last iteration of the displacing step, $a_{00i}$ is the pixel value of the first pixel of the respective row of the reference pixel array prior to the last iteration of the displacing step, and $a_{noi}$ is the pixel value of the last pixel of the respective row of the reference pixel array after the reference pixel array has been displaced by one pixel to the right with respect to the previous position of the reference pixel array as a result of the last iteration of the displacing step.

16. A device that implements the method set forth in claim 15.

17. The method as set forth in claim 10, wherein the reference pixel array is located in a prescribed search region of a reference picture.

18. The method as set forth in claim 10, wherein the reference pixel array has a size and structure defined by an MPEG standard.

19. The method as set forth in claim 10, wherein the method is implemented by a motion estimation search engine of a digital video encoder.

20. The method as set forth in claim 10, wherein the shift register comprises an M-word shift register.

21. A device that implements the method as set forth in claim 10.

22. A device for updating a horizontal sum representing the sum of the values of N pixels contained in a horizontal row of a reference pixel array during a motion estimation search, the device including:

means for computing the horizontal sum;

means for displacing the reference pixel array by one pixel in a horizontal direction; and, means for updating the horizontal sum to produce a new horizontal sum by adding a new pixel value to the previously-computed horizontal sum, and subtracting an old pixel value no longer contained in the horizontal row of the reference pixel array after displacement of the reference pixel array by one pixel in the horizontal direction, from the previously-computed horizontal sum.

23. A device for generating a horizontal sum for each of N rows of a reference pixel array and for simultaneously generating a vertical sum for each of M columns of the reference pixel array for each iteration of a horizontal motion estimation search of a prescribed search region of a reference picture, the device including:

(a) a memory for storing initial pixel values corresponding to an initial position of the reference pixel array by storing M individual pixel values in each of N rows of the memory and storing N individual pixel values in each of M columns of the memory;

(b) means for computing the horizontal sum for each of the N rows of the initial position of the reference pixel array and for storing each of the computed horizontal sums;

(c) means for computing the vertical sum for each of the M columns of the initial position of the reference pixel array;

(d) a shift register for storing the computed vertical sums;

(e) means for displacing the reference pixel array by one pixel in a horizontal direction;

(f) means for, in response to each displacement of the reference pixel array by one pixel in the horizontal direction:

i) providing N new pixel values, one for each of the N rows of the reference pixel array corresponding to a last column of the reference pixel array after being displaced by one pixel in the horizontal direction;

ii) summing the N new pixel values to produce a new vertical sum, and applying the new vertical sum to the shift register, and shifting the previously-stored vertical sums by one word in the horizontal direction of the motion estimation search, whereby a first-stored vertical sum is discarded and the new vertical sum is stored in the former storage location of a last-stored vertical sum;

iii) outputting a set of M new vertical sums from the shift register;

iv) updating each of the horizontal sums to produce a set of N new horizontal sums by adding the respective one of the N new pixel values to the previously-computed horizontal sum for each of the N rows, and by subtracting respective old pixel values no longer contained in the M columns of the reference pixel array after being displaced by one pixel in the horizontal direction from the previously-computed horizontal sum for each of the N rows; and, v) outputting the set of N new horizontal sums.

24. The device as set forth in claim 23, wherein the memory is a RAM.

25. The device as set forth in claim 23, wherein the shift register comprises an M-word shift register.

26. The device as set forth in claim 23, wherein the means for computing the vertical sum for each of the M columns of the initial position of the reference pixel array comprises an N-input adder circuit.

27. The device as set forth in claim 26, wherein the means for summing the N new pixel values to produce a new vertical sum, and applying the new vertical sum to the shift register comprises the N-input adder circuit.

28. The device as set forth in claim 23, wherein the means for computing the horizontal sum for each of the N rows of the initial position of the reference pixel array and for storing each of the computed horizontal sums comprises a plurality N of respective horizontal sum modifier circuits.

29. The device as set forth in claim 28, wherein the means for updating each of the horizontal sums to produce a set of N new horizontal sums comprises the plurality N of respective horizontal sum modifier circuits.

30. A device for updating a horizontal sum representing the sum of the values of N pixels contained in a horizontal row of a reference pixel array during a motion estimation search during which the reference pixel array is displaced by one pixel in a horizontal search direction during each of a plurality of iterations of the motion estimation search, the device including a horizontal sum modifier circuit that accumulates the values of the N pixels contained in the horizontal row of the reference pixel array prior to any displacement of the reference pixel array to produce the horizontal sum, and that updates the horizontal sum by computing the new horizontal sum using the following equation:

$$OS_{NEW} = OS_{OLD} - a_{00} + a_{no},$$

where $OS_{NEW}$ is the new horizontal sum after the last displacement of the reference pixel array by one pixel in the horizontal direction, $OS_{OLD}$ is the horizontal sum prior to the last displacement of the reference pixel array by one pixel in the horizontal direction, $a_{00}$ is the pixel value of the pixel that was the horizontal origin of the reference pixel array prior to the last displacement of the reference pixel array by one pixel in the horizontal direction, and $a_{no}$ is the pixel value of the pixel that is the horizontal origin of the reference pixel array after the reference pixel array has been displaced by one pixel to the right with respect to the previous position of the reference pixel array as a result of the last displacement of the reference pixel array by one pixel in the horizontal direction.

* * * * *